United States Patent
Weiss et al.

(10) Patent No.: US 7,460,647 B2
(45) Date of Patent: Dec. 2, 2008

(54) ROTARY ANODE AS WELL AS A METHOD FOR PRODUCING A COOLING ELEMENT OF A ROTARY ANODE

(75) Inventors: Roland Weiss, Hüttenberg (DE); Thorsten Scheibel, Bad Nauheim (DE); Marco Ebert, Wetter (DE); Martin Henrich, Wetzlar (DE)

(73) Assignee: Schunk Kohlenstofftechnik GmbH, Heuchelheim (DE)

( * ) Notice: Subject to any disclaimer, the term of this patent is extended or adjusted under 35 U.S.C. 154(b) by 222 days.

(21) Appl. No.: 11/458,858

(22) Filed: Jul. 20, 2006

(65) Prior Publication Data
US 2007/0195934 A1  Aug. 23, 2007

(30) Foreign Application Priority Data
Jul. 25, 2005 (DE) ........... 10 2005 034 585
Dec. 22, 2005 (DE) ........... 10 2005 062 074

(51) Int. Cl.
H01J 35/10 (2006.01)
(52) U.S. Cl. ................................. 378/144
(58) Field of Classification Search ............... 378/143, 378/144
See application file for complete search history.

(56) References Cited

U.S. PATENT DOCUMENTS

| | | | |
|---|---|---|---|
| 4,344,012 A * | 8/1982 | Hubner et al. ............ 378/144 |
| 4,945,562 A | 7/1990 | Staub ...................... 372/26 |
| 5,943,389 A * | 8/1999 | Lee ......................... 378/144 |
| 6,430,264 B1 | 8/2002 | Lee ......................... 378/144 |
| 6,432,536 B1 | 8/2002 | Hecht et al. .............. 428/408 |
| 2002/0162624 A1 | 11/2002 | Ebert et al. .............. 156/254 |
| 2004/0191495 A1 | 9/2004 | Lenz ..................... 428/292.1 |

FOREIGN PATENT DOCUMENTS

DE  10304936  10/2004
JP  61022546  1/1986

* cited by examiner

Primary Examiner—Courtney Thomas
(74) Attorney, Agent, or Firm—Dennison, Schultz & MacDonald

(57) ABSTRACT

The invention involves a rotary anode of an x-ray tube with a cooling element of carbon fiber material constructed so as to be rotationally symmetrical around a coaxial rotation axis. In order to achieve a high heat conducting capability, it is recommended that the base of the cooling element (14) be a preform constructed according to the tailored fiber placement process (TFP), that the cooling element have a hollow cylinder and a one-piece construction, that the carbon fibers (22) run parallel along its entire length or basically parallel to the axis (16) and have a heat conductivity $\lambda$ with $\lambda >/= 250$ W/m×K, and that the carbon fibers be connected across a matrix containing carbon whose graphite crystallites are aligned along the carbon fibers.

22 Claims, 1 Drawing Sheet

Figure 1:
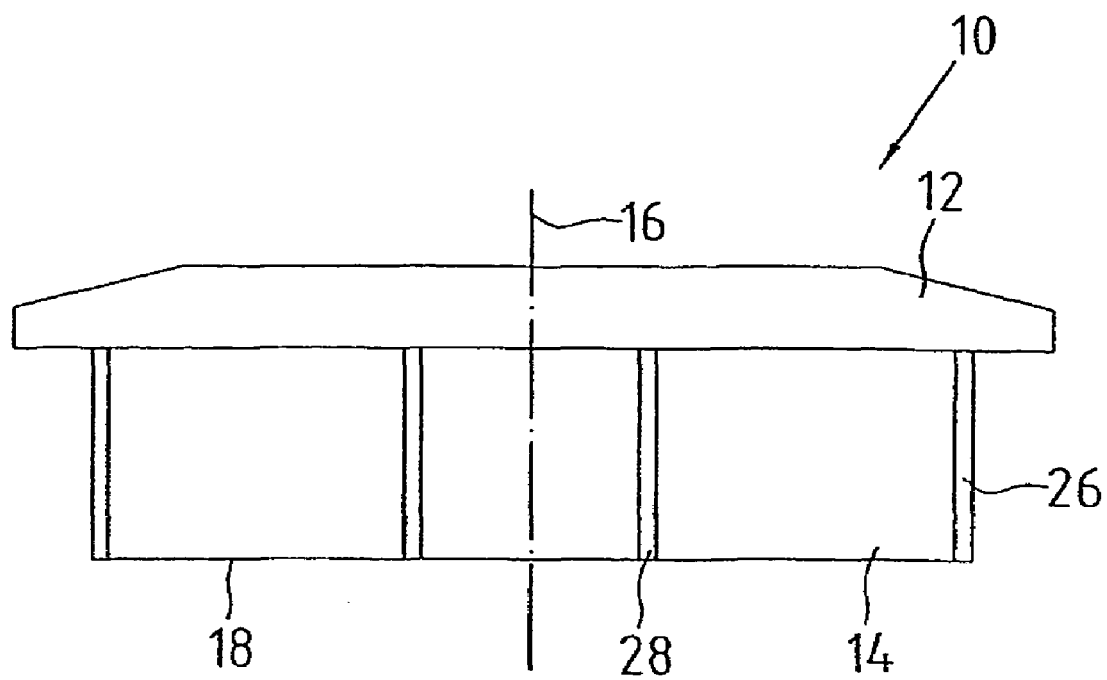

ROTARY ANODE AS WELL AS A METHOD FOR PRODUCING A COOLING ELEMENT OF A ROTARY ANODE

BACKGROUND OF THE INVENTION

The invention involves a rotary anode, especially an x-ray tube with a rotation axis including a cooling element of carbon fiber material constructed so as to be rotationally symmetrical around a coaxial rotation axis with carbon fibers extending along the rotation axis as well as a combustion ring extending perpendicular to the rotation axis. In addition, the invention involves a method to produce a rotationally symmetrical cooling element of a rotary anode rotating around a rotation axis with carbon fibers having a high heat conductivity running along the axis.

A rotary anode with a cooling element of the type named at the outset is known from DE-B-103 04 936. In order to be able to conduct the high temperatures appearing on the combustion ring well, namely on the target surface, the cooling element has a cup-shaped geometry, in order to allow the high heat conductivity carbon fibers running inside the cooling element to end bluntly both on the target underside as well as on a cooling tube running coaxially to the rotation axis which is flowed through by a coolant.

A rotary anode is known from U.S. Pat. No. 5,943,389 in which a heat conducting connection is made via a C-combination element in which carbon fibers running parallel to each other are connected across a carbon matrix. The heat conducting capability of the carbon fibers can lie in the range between 400 W/mK to 1000 W/mK.

A rotary anode can be seen in JP-A-61-022546 which is composed of structural parts containing carbon fibers, so called prepregs. The fibers can here run in one direction.

A rotary anode for an x-ray tube is known from DE-B-40 12 019. The rotary anode has a hollow anode plate to which a cooling liquid is sent across a hollow shaped wave.

Fiber compound materials have proved their worth for removing heat from rotary anodes, since they are lighter than the metal elements customarily used, so that the rotary anodes rotate with a high frequency and/or can have larger diameters. In any event practice has shown that the heat conductance does not sufficiently meet the requirements of highly developed x-ray devices, especially CT devices. In addition, rotary anodes using known carbon compound materials have the disadvantage that cooling tubes flowed through by a coolant must also be frequently integrated so that the construction of such rotary anodes is expensive.

A cooling element from EP-A-0 629 593 which is used for brake linings or electronic devices has a preform consisting of carbon fibers with a matrix consisting of carbon material. The carbon fibers move parallel to each other. To manufacture the perform, pitch fibers are first wrapped around a spool in order to form a cylinder which is then separated into sections, which are then finally bent. There then follows a carbonizing and graphitizing of the two dimensional preform plates.

SUMMARY OF THE INVENTION

This invention is based upon the objective of further developing a cooling element of a rotary anode as well as a method to manufacture a cooling element of the type named at the outset such that a high heat conductivity can be obtained, in order that the rotary anode to be cooled with the cooling element can be used without interruption over a longer time when compared with known rotary anodes. In addition, the cooling element should also have a lower mass, so that the rotary anode can be turned with a high frequency and/or can be constructed with a larger diameter.

To solve the problem, a rotary anode of the type mentioned at the beginning is further developed in that the base of the cooling element is a preform manufactured in a tailored fiber placement method (TFP), the cooling element has a hollow cylinder and is constructed in one piece, in that the carbon fibers run in a parallel manner over the entire length, or run basically parallel to the axis, and have a heat conductivity, $\lambda$ with $\lambda >/= W/m \times K$, and in that the carbon fibers are connected across a matrix containing carbon whose graphite-crystalline is aligned along the carbon fibers.

According to the invention, a cooling element is used which is in contact—preferably directly—with the combustion ring of a rotary anode in which the carbon fibers run parallel along the entire length or basically parallel to the rotation axis of the anode body. In addition the graphite-crystalline of the carbon matrix, across which the carbon fibers are connected with the fibers, is aligned along the fibers, whereby a high heat conductivity can be obtained, which is greater than 250 W/mK, in particular greater than 600 Wm/mK, preferably in the range of 600 W/mK and 650 W/mK. Since the graphite-crystalline is also placed on the carbon fibers, the heat conducting capability is also thereby raised. The heat is then radiated across the cooling element itself, i.e., the front side turned toward the combustion ring. In addition, cooling channels flowed through by a cooling liquid are not necessary.

The monolithically constructed cooling element has the form of a cylinder, whereby for stabilization purposes a support ring can run along its circumference and/or interior area which can, for example, be pressed on the cooling element. The support ring should consist of a carbon fiber material (CFC).

Independently thereof, the cooling element is a preform which is manufactured according to the tailored fiber placement (TFP) process. To do that, endlessly long carbon fibers or long carbon fibers are sewn on the basic textile material, whereby the fibers are placed in a meandering manner, so that they are aligned parallel to each other with the exception of the bent ends. The bent ends are cut off before heat treatment of the preform manufactured in this manner. Preferably the long carbon fibers are sewn to the basic textile material such that the bent ends protrude over the basic textile material that has a striped shape. There is naturally also the possibility, that the basic textile material in divided into stripes after the sewing on of the long carbon fibers, so that more bases are simultaneously formed according to the TFP method which are then wrapped around a cylinder body in order to produce a cooling element.

The invention is also characterized by a method to manufacture a rotationally symmetrical cooling element of a rotary anode able to turn around a rotation axis with carbon fibers of a high heat conductivity running along the axis with the following procedural steps:

Manufacture of a stripe-shaped preform according to the tailored fiber placement method (TFP) by sewing carbon fibers on a basic textile material in such a manner, that the carbon fibers in the preform run parallel or basically parallel to each other, Wrapping the stripe-shaped preform on a cylinder body, Impregnating the preform with carbon or a material converted by carbonizing to carbon, Heat treating the impregnated preform, One or more recompressions of the heat-treated preform, High temperature treatment, and Mechanical final processing of the element so manufactured to obtain the definitive shape of the cooling element.

The heat treatment and recompression occur in such a manner that the graphite crystallites of the connecting carbon fibers are aligned along the carbon fibers by the impregnation and the heat treatment of the constructed matrix. As a result, the heat conducting capability is also increased, so that the desired cooling effect is obtained.

A rearrangement of the graphite crystals of the matrix along the fiber surface is possible by the selection of suitable treatment parameters and suitable carbon matrix systems because of the alignment of the graphite crystal layers in the carbon fibers and the orientation of the fiber upper surface. Suitable carbon matrix systems are materials able to graphitize well, like pitch or pyro-graphite. Thermally interlaced resins should be avoided, since the graphitizing properties are not so good.

The graphitizing can also occur in a vacuum to align the crystals along the carbon fibers. In the process, a sublimation of the carbon must be largely avoided. Alternatively, or in addition a tension or a pulling should act on the carbon fibers during the graphitizing. All this causes the alignment of the crystals along the carbon fibers with the consequence that the desired increase of the heat conductance appears.

In order to obtain a high heat conductivity, the volume content of the carbon fibers should also lie between 40% and 80%, but especially between 60% and 70%. That is achieved by the preform manufactured according to the tailored fiber placement method being wrapped around the cylinder body with defined tensile forces. Values between 3 kp and 15 kp are the preferred tensile forces, but in particular 5 kp and 10 kp.

Another possibility of setting the volume content of the carbon fibers to a desired value, especially between 6 vol % and vol % 70, consists of using press rollers which compress the fiber tracks when wrapping on the core.

The tailored fiber placement process itself can be inferred from the literature, for example, Mattheij et al., "Tailored Fiber Placement Mechanical Properties and Applications", Journal of Reinforced Plastics and Composites, Vol 17, No. 9/1998, pp 774-786. In that regard that publication is expressly referenced.

The initial condition of a preform manufactured in this manner usually has a heat conductivity between 115 W/mK and 200 W/mK, whereby there is the advantage, that the preform to manufacture the cooling element is well tradable and has a sufficient mechanical strength. Able to be used as the actual fibers are fibers that can be graphitized or are already graphitized, especially carbon fibers on a pitch base. The diameter of the fibers should be in the range of 4 µm and 9 µm, but preferably 8 µm.

After the wrapping of the preform on the core a heat treatment occurs in such a manner that the heat conductivity occurs in place, whereby a heat conductivity in the range between 600 W/mK and 650 W/mK is preferred. Independent thereof, the heat conductivity in any case should be greater than 250 W/ml.

The high heat conductivity is thereby achieved by the fibers being stabilized and fixed in the preform by means of CVI impregnation with PyC and by means of impregnation with matrix precursors which are easily graphitized. Finally, the preform that is so fixed is subjected to a high temperature treatment with temperatures, T, with preferably T>2800° C., so that the fibers as well as the matrix are graphitized, and by means of the fixing of the fibers in the matrix section, graphite effects due to the deformation of the fibers are used for an increase of the heat conductivity because of an improved graphitization process.

The fibers of the preform or the preform itself can be treated by dry or wet impregnation with resins or pitches, whereby a hardening next follows. Then a wet impregnation is performed with resins or pitches or a gas impregnation especially in a CVI process with pryo-carbon (PyC). Next there follows a further treatment, whereby with the use of resins and pitches a carbonizing first occurs and then a graphitization follows, but with a dry impregnation there is only a graphitization. The carbonizing to convert the impregnation means into carbon preferably occurs in the temperature range between 700° C. and 1200° C., preferably in the range between 900° C. and 1050° C. Graphitization temperatures lie in the range between 2400° C. and 3500° C., preferably between 2600° C. and 3300° C.

Materials with high carbon yields are used for wet impregnation, in order to facilitate a conversion into carbon. During the wet impregnation a heat treatment step is added by means of which a hardening or an interlacing of the impregnation material occurs or in the case of pitch a melting on of the impregnation means.

During the heating process the integral, monolithic cooling element in the form of a hollow cylinder should be supported on a plate and in particular surrounded by a support ring in order to guarantee avoiding an undesired change in shape during heat treatment.

If the impregnation is preferably performed after the wrapping of the preform on the cylinder body, there then also exists the possibility that a partial impregnation occurs at least beforehand.

After the heat treatment, i.e., the carbonizing and graphitization, a recompression occurs which includes a vacuum pressure impregnation with hardening, carbonizing and graphitization in order to improve the heat conductivity. In the process the recompression can preferably occur two to four times without thereby limiting the basic concept of the invention.

Not only is the heat conductivity improved by the recompression, but at the same time, the density is also increased and the porosity minimized, whereby the mechanical strength of the cooling element is again improved. In particular the recompression is conducted to the extent, that an open porosity of less than 14 vol % but preferably less than 10 vol % and a density of the manufactured cooling element in the range between 1.5 g/cm$^3$ and 2.2 g/cm$^3$, especially in the range between 1.75 g/cm$^3$ and 2.0 g/cm$^3$ occur.

After one or several recompressions, there follows a high temperature treatment which can be called the final graphitization. The high temperature treatment is conducted in the range between 2400° C. and 3500° C. Finally a body manufactured in such a manner is processed into its final shape by means of machining. If needed, a support structure is applied in the form of CFC rings which are of high strength. The support rings can be applied to the inner and/or outer circumference area.

If desired, a CVD coating can be applied on the cooling element after the final processing, in order to avoid a "particle release". Preferably a PyC coating is applied. Independently thereof, the coating should have a high emission factor, $\epsilon$, with $0.5 </= \epsilon < 1$, in particular $0.8 </= \epsilon </= 0.9$.

There is the possibility of cleaning this cooling element in a high temperature process prior to this coating. By means of the cleaning, crystallite formation is positively influenced, since at positions at which impurities were located before the high temperature cleaning, an especially good crystallite formation occurs. Contamination can also be used in specific instances to improve the graphitization capability and thus increase the heat conductivity, when they are again removed in a high temperature cleaning process.

BREIF DESCRIPTION OF THE DRAWINGS

Figure 2:
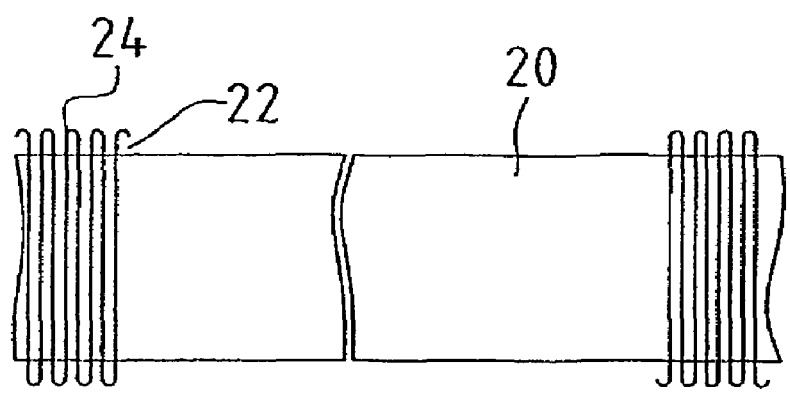

Other details, advantages and characteristics of the invention are shown not only in the claims, the properties to be taken from them alone or in combination but also in preferred embodiments to be inferred from the following description of the drawings, wherein:

FIG. 1: Is a cut through a rotary anode, and
FIG. 2: Is a section of a preform to be manufactured.

DESCRIPTION OF THE PREFERRED EMBODIMENTS

The concept of the invention will be explained on the basis of a cooling element intended for a rotary anode 10 without the invention being thereby limited in the process.

Thus FIG. 1 shows a rotary anode 10 designed for computer tomographs. The rotary anode 10 is composed of a combustion ring 12 made of tungsten and a cooling element 14. The rotary anode 10 is placed on a shaft, which is not depicted, and rotates around an axis 16. In order to obtain a high measurement point density in the shortest time, the rotary anode is turned with frequencies of 150 hertz. The diameter can lie in the range between 150 mm and 250 mm without that being considered as a limitation.

In order to be able to drain off the heat from the combustion ring 12 well (whereby it can be guaranteed that the rotary anode can be used without interruption over a longer time period), the cooling element 14 is a carbon compound body which consists of carbon fibers running parallel to axis 16 and parallel to each other that are connected across a carbon matrix. In the manufacture of the cooling element 14, there thus occurs in situ such an increase of the heat transfer capability, that the carbon fibers have a heat transfer capability of more than 250 W/mK, especially in the range between 600 W/mK and 650 W/mk. It is thereby ensured that the heat conducted from the combustion ring 12 across the cooling element 14 can be radiated in a sufficient amount across the front side 18 of the cooling element 14 turned away from the combustion ring.

The cooling element 14 consists of a spiral-shaped, wrapped, preform which is manufactured according to the tailored fiber placement method. In the process, an endless carbon fiber 22 is placed in a meandering manner on a textile base material 20, which has a high C-yield, and sewn on. Then the bent sections 24 are cut off preferably along the edges of the basic material 20, so that there results a stripe-shaped preform in which the carbon fibers 22 are aligned parallel to each other and vertical to the long axis of the basic material 12. Such a preform is then wrapped around a cylindrical body called a core, whereby the carbon fibers 22 run parallel to the axis of the core. The wrapping around the core occurs in such a manner, that a desired fiber volume content is obtained which should lie in the range between 40% and 80%, but preferably between 60% and 70%. Tensile forces, F, between 5 kp and 10 kp are thereby used. Alternatively or supplementally, pressing rollers can be used on the preform when wrapping around the core, whereby a setting of the fiber volume content can be made to the desired value or it be supported. Finally there occurs a wet or gas phase impregnation. The wet impregnation occurs with a material having a high carbon yield, in order to facilitate a conversion into C. Resins and pitches are named in particular. The CVI process with PyC is considered for the gas phase impregnation.

It should be mentioned that the fibers can be treated with resin or pitch even when wrapping the preform on the core, without thereby leaving the concept of the invention.

Independently thereof, a heat treatment follows the impregnation, whereby, when using resins or pitches, a hardening or interlacing of the impregnation means occurs, while pitch must be heated to melt on before the impregnation. The heat treatment includes a carbonizing when using resins or pitches, as well as graphitization and during a gas phase impregnation only the graphitization. The carbonizing preferably occurs in a temperature range between 700° C. and 1200° C., especially in the range between 900° C. and 1050° C., while the graphitization occurs in the range between 2400° C. and 3500° C., but preferably between 2600° C. and 3300° C. A cooling follows the heat treatment in order to then be followed by one or more recompressions. The recompression includes a vacuum pressure impregnation in order to increase the density and to minimize the porosity. In the process, the mechanical strength of the body to be manufactured is increased. In particular the cooling element 14 should be so recompressed, that the density, $\rho$, amounts to $\rho > 1.85$ g/cm$^3$.

In addition, a gas cleaning should occur, in order to remove impurities. In the process, the formation of crystallites is increased.

During recompression a heat conducting filler material can be added to the impregnation means.

Separately from this, there follows the recompression, i.e., impregnation, hardening and carbonizing, to such an extent, that the body to be manufactured has an open porosity of less than 14 vol % but preferably less than 10 vol %, and/or a density in the range between 1.5 g/cm$^3$ and 2.2 g/cm$^3$, especially in the range between 1.75 g/cm$^3$ and 2.0 g/cm$^3$.

Then a high temperature treatment in the range between 2400° C. and 3500° C. is performed. Next the body is processed to its final shape by machining. If necessary, the body can be provided with a support structure in the form of CFC rings which are of high strength. The rings can be placed on the exterior and/or interior of the hollow cylinder body.

Finally, if necessary, a CVD coating can follow, like a PyC coating, in order to avoid a "particle release". The coating should have a high emission factor, $\epsilon$, between $0.5 </= \epsilon < 1$, in particular between $0.8 </= \epsilon </= 0.9$.

If a cleaning is envisioned, that should be done between the final processing and the CVD coating. A high temperature gas cleaning is performed for improvement of the purity and the degree of graphitization. In order to reduce the particle release a cleaning by means of ultrasound is selected.

Finally a support ring 26, 28 of high strength CFC can be pressed on the cooling element 14.

The preform can be removed from the core before each impregnation step or heat treatment step. Of course, it is also possible to remove the preform from the core after the heat treatment. The removal of the preform should only first occur, when it was guaranteed in the procedural steps to be performed, that a deformation of the form which is no longer on the core will not occur. Thus the preform should surround the core at least before each high temperature treatment step, even if in the previous procedural step a removal can occur.

The invention claimed is:

1. Rotary anode for an x-ray tube, comprising a cooling element rotatable about a rotation axis, and a combustion ring extending perpendicular to the rotation axis, the cooling ring formed of carbon fiber material constructed so as to be rotationally symmetrical surrounding the rotation axis with carbon fibers extending along the rotation axis, the base of the cooling element being a preform manufactured by tailored fiber placement (TFP), having a shape of a hollow cylinder and being constructed as one piece, wherein the carbon fibers run substantially parallel along their entire length to the axis and have a heat conductivity, $\lambda \geq 250$ W/m×K, and wherein the carbon fibers are connected across a matrix containing carbon, with graphite crystallites aligned along the carbon fibers.

2. Rotary anode according to claim 1, wherein the cooling element comprises a support ring along its circumference and/or interior area.

3. Rotary anode according to claim 2, wherein the support ring is pressed on the cooling element.

4. Rotary anode according to claim 2, wherein the support ring comprises a fiber material (CFC).

5. Rotary anode according to claim 1, wherein the cooling element has a density, $\rho$, with $1.5$ g/cm$^3 < \rho \leq 2.2$ g/cm$^3$.

6. Method for producing a rotationally symmetrical cooling element for a rotary anode for an x-ray tube, rotating around a rotation axis, and comprising carbon fibers of a high heat conductivity running along the axis, comprising the steps of:

producing a stripe-shaped preform according to a tailored fiber placement method (TFP) by sewing of carbon fibers on a textile base material such that the carbon fibers run substantially parallel to each other in the preform;

wrapping the stripe-shaped preform on a cylindrical body;

impregnating the preform with carbon or a material converted by carbonizing to carbon;

heat treating the wrapped, impregnated perform;

recompressing the heat-treated perform at least once;

treating the recompressed, heat-treated preform under high temperature to produce a body; and mechanically definitively processing the body to attain a definitive shape of the cooling element.

7. Method according to claim 6, wherein the carbon fibers sewn on the textile base material are long carbon fibers or meandering endless carbon fibers, with bent sections protruding beyond edges of the textile base material which are cut off before wrapping on the cylindrical body, or after removal of the preform from the cylindrical body.

8. Method according to claim 6, wherein the preform is treated before or after the wrapping with a resin and/or pitch.

9. Method according to claim 6, wherein the preform is wrapped on the cylindrical body with a tensile force, F, such that there results a fiber volume content, V, in the wrapped preform of between 40 vol % $\leq$ V $\leq$ 80 vol %.

10. Method according to claim 9, wherein the tensile force, F is 3 kp $\leq$ F $\leq$ 15 kp.

11. Method according to claim 6, wherein pressure rollers act on the preform during the wrapping on the cylindrical body.

12. Method according to claim 6, wherein the preform wrapped on the cylindrical body is impregnated by means of gas phase impregnation and/or liquid impregnation.

13. Method according to claim 12, wherein the gas phase impregnation occurs with pyro-carbon (PyC).

14. Method according to claim 8, wherein the preform is carbonized during the treatment of the preform with resin and/or pitch with a temperature, $T_c$, in a range 700° C. $\leq T_c \leq$ 1200° C.

15. Method according to claim 6, wherein the impregnated preform is graphitized at temperature of 2400° C. $\leq T_G \leq$ 3500° C.

16. Method according to claim 6, wherein the material used for impregnation contains heat-conducting filler material.

17. Method according to claim 6, wherein object is coated with a material after said processing which has an emission factor between $0.5 \leq \epsilon < 1$.

18. Method according to claim 17, wherein the object is coated with PyC by CVD.

19. Method according to claim 6, wherein the object after said processing and before its coating is subjected in particular to a gas cleaning and/or ultrasound cleaning, and then coated.

20. Method according to claim 6, wherein the preform is removed from the cylindrical body after the high temperature treatment.

21. Method according to claim 6, wherein the preform is impregnated with a material that graphitizes well, in order to align graphite crystallites along the carbon fibers.

22. Method according to claim 6, wherein the carbon fibers have a diameter D, with 4 µm $\leq$ D $\leq$ 9 µm.

* * * * *